United States Patent Office 3,458,470
Patented July 29, 1969

3,458,470
POLYAMIDES CONTAINING MANGANESE FOR LIGHT STABILIZATION AND STABILIZED AGAINST BLEACH DISCOLORATION WITH TUNGSTEN OR MOLYBDENUM
Owen Burchell Edgar, Manchester, England, assignor to Imperial Chemical Industries Limited, London, England, a corporation of Great Britain
No Drawing. Filed Jan. 28, 1966, Ser. No. 523,566
Claims priority, application Great Britain, Feb. 11, 1965, 5,992/65, Patent 18,098; 5,993/65, Patent 18,099; 5,994/65, Patent 18,100
Int. Cl. C08g 51/62, 51/56, 51/04
U.S. Cl. 260—37    5 Claims

ABSTRACT OF THE DISCLOSURE

Pigmented polyamides containing pigments such as titanium dioxide but with good resistance to degradation by light and improved properties in respect of susceptibility to discoloration by bleaching agents such as alkali metal chlorites and obtained when there is present manganese and either tungsten or molybdenum in the form of their chemical compounds.

---

This invention relates to synthetic linear fibre forming polyamides having improved resistance to oxygen at elevated temperatures and also to synthetic linear fibre-forming polyamides having improved resistance to light.

It is known that synthetic linear fibre forming polyamides such as polyhexamethylene adipamide and polycaprolactam tend to be discoloured by exposure to hot air, as for example during the heat setting of nylon fabric. We have now found that polyamides with good resistance to degradation by hot air can be obtained when tungsten or molybdenum are present in the form of their chemical compounds.

According to the present invention we provide synthetic linear fibre forming polyamides containing tungsten or molybdenum in the form of a chemical compound.

The tungsten may be added, for example, as tungstic acid or a polytungstic acid, or as a tungstate or poly tungstate, for example sodium tungstate, ammonium metatungstate, or hexamethylene diamine tungstate, as tungsten trioxide, or as a heteropolytungstic acid, for example a silicotungstic acid, phosphotungstic acid (especially dodecatungstophosphoric acid), or phosphomolybdotungstic acid, or as a phosphotungstate such as sodium phosphotungstate or ammonium phosphotungstate.

The molybdenum may be added, for example, as one of its oxides, especially the trioxide, as molybdic acid or a polymolybdic acid, or a molybdate or polymolybdate, for example ammonium molybdate, or as a heteropolymolybdic acid (or salt thereof), for example a silicomolybdic acid, phosphomolybdic acid or phosphomolybdotungstic acid.

Preferably the tungsten or molybdenum is present in the proportion of from 0.001% to 1.0% by weight calculated as the metal.

The tungsten or molybdenum may be added to the polyamides if desired together with materials already known to improve light or heat stability, for example manganese compounds or copper compounds optionally together with phosphate or halide salts. Especially suitable materials of this kind containing manganese compounds are those further described in U.K. patent specifications Nos. 861,354 and 862,577 and in our co-pending application No. 33,683/62 (U.K. specification No. 997,-316), for example polyphosphate complexes produced by reacting manganese salt with an alkali metal polyphosphate or an alkali metal polymetaphosphate, or a phosphate of divalent manganese or a non-complex double phosphate of divalent manganese and ammonia and/or an alkali metal, or mixtures of a manganese compound with an oxy compound of phosphorus (for example an ortho or pyrophosphate salt). Suitable materials containing copper and halide or other compounds are described for example in U.K. patent specification No. 722,724 (U.S. patent specification No. 2,705,227) and U.K. patent specification No. 839,067 (U.S. patent specification No. 2,960,489), for example a copper compound (for example copper acetate) and an alkali metal or ammonium halide (for example sodium iodide) or a copper compound and the halide of an organic base. Very small amounts of copper and halide compounds are sometimes found to be effective, for example from 3 to 9 parts per million of a copper compound (calculated as Cu) may be added together with from 100 to 900 parts per million of an alkali metal, ammonium or organic base halide, by weight of the polyamide.

It is also known that synthetic linear fibre forming polyamides such as polyhexamethylene adipamide and polycaprolactam tend to be degraded by exposure to light, especially when they contain pigments such as titanium dioxide which are often employed to increase the opacity of fibres made from these polyamides, and it has been proposed to improve the light stability of pigmented polyamides by incorporating manganese compounds in the polyamides. However, the manganese compounds which have been used hitherto have usually had the disadvantage of being affected by certain bleaching agents, and this has led to discolouration difficulties in the processing of textile materials made from polyamides containing these manganese compounds. We have now found that pigmented polyamides with good resistance to degradation by light and improved properties in respect of susceptibility to discolouration by bleaching agents such as alkali metal chlorites can be obtained when there is present in addition to manganese either tungsten or molybdenum in the form of their chemical compounds.

Thus according to a further feature of the present invention we provide synthetic linear fibre forming polyamides containing a pigment and manganese and either tungsten or molybdenum the manganese and the tungsten or molybdenum being present in the form of one of their chemical compounds.

Preferably the manganese is present as a manganese tungstate or phosphotungstate or as a manganese molybdate or phosphomolybdate or as a chemical equivalent of these compounds. Thus the manganese may be added to the polyamide during or after manufacture of the polyamide in combination with some other radical than the tungstate, phosphotungstate, molybdate or phosphomolybdate radical for example, as manganese acetate, oxalate, adipate, lactate, orthophosphate, pyrophosphate or any of the manganese compounds known from the art to improve the light stability of pigmented synthetic linear fibre forming polyamide. The tungsten or molybdenum may be added in the form of any of the compounds of tungsten or molybdenum, for example those compounds which have already been mentioned. Such additions of manganese and tungsten or molybdenum compounds are to be regarded as equivalent to additions of manganese tungstate or phosphotungstate or manganese molybdate or phosphomolybdate for the purpose of the present invention.

Preferably the manganese is employed in the proportion of from 5 parts per million to 100 parts per million by weight of the polyamide (calculated as manganese), and the tungsten or molybdenum is present preferably in the proportion of from 0.001% to 0.25% (10 to 2500 parts per million) by weight calculated as tungsten or molybdenum.

Usually the maganese and tunsten or molybdenum are employed in amounts relative to each other which correspond approximately to the ratio of their atomic weights. but different proportions can be used if desired.

The pigment, for example titanium dioxide, is normally present in an amount within the range 0.02% to 3.0% by weight of the polyamide.

When improved heat resistance as well as improved light resistance is required it is found that additions of copper compounds and halide compounds can be made together with the additions of combined manganese and combined tungsten or molybdenum, and such mixed additives are found to have only a small effect on the state of the dispersion of the delustrant in the polyamide. Suitable copper and halide compounds are those already mentioned.

The tungsten or molybdenum and other additions are preferably made during the manufacture of the polyamides, that is the additions are made to the polyamide forming components during polymerisation, or the additions may be made after polymerisation or during conversion of the polyamide to fibres.

The invention is illustrated by the following examples in which the parts and percentages are by weight.

Example 1

A mixture of 262 parts of hexamethylene diammonium adipate, 175 parts of water, 0.6 parts of acetic acid, and 0.42 parts of dodeca-tungstophosphoric acid was heated in an autoclave in the absence of air. When, at a temperature of about 215° C., the pressure had risen to 250 p.s.i.g. it was maintained at this level by releasing steam. About ten minutes after the start of steam release 4.52 parts of $TiO_2$ dispersed in water was added to the autoclave and heating was continued until the temperature had risen to 245° C. The pressure was then gradually reduced to atmospheric pressure over 90 minutes while heating was continued so that the temperature rose to 270° C. Polymerisation was continued at 270–275° C. and atmospheric pressure for a further 30 minutes and the polymer was then extruded from the autoclave under nitrogen pressure, quenched in water and cut into small flakes. The polymer was then melt spun and drawn in conventional manner to continuous filaments.

A composite warp-knitted fabric was then prepared having a broad stripe of the nylon filaments prepared as described above, lying between "control" strips of nylon filaments prepared in a similar manner but omitting the dodecatungstophosphoric acid. The composite fabric was then heat set on a stenter at 230° C. for 30 seconds. After this treatment the stripe containing tungstophosphoric acid modified polymer remained white, whereas the unmodified fabric had turned yellow.

Example 2

A mixture of 262 parts of hexamethylene diammonium adipate, 175 parts of water, 0.6 parts of acetic acid and, 0.5 part of manganous actate tetrahydrate, 0.42 part of dodecatungstophosphoric acid, 0.0035 part of cupric acetate monohydrate, and 0.1 part of hexamethylene diammonium iodide was polymerised by the process described in Example 1. The polymer was converted into continuous filament yarn by conventional methods and the yarn was introduced into a warp-knitted fabric as a broad stripe bounded by standard 66 nylon yarns. After heat setting at 230°/30 seconds the fabric generally had a yellow colouration except in the stripe of fabric containing tungstophosphoric acid, which remained white.

Example 3

A mixture of 262 parts of hexamethylene diammonium adipate, 175 parts of water, 0.6 part of acetic acid, 0.05 part of manganous acetate tetrahydrate and 0.42 part of dodecatungstophosphoric acid was heated in an autoclave in the absence of air. When, at a temperature of about 215° C., the pressure had risen to 250 p.s.i.g. it was maintained at this level by releasing steam. About ten minutes after the start of steam release 4.52 parts of $TiO_2$ dispersed in water was added to the autoclave and heating was continued until the temperature had risen to 245° C. The pressure was then gradually reduced to atmospheric pressure over 90 minutes while heating was continued so that the temperature rose to 270° C. Polymerisation was continued at 270–275° C. and atmospheric pressure for a further 30 minutes and the polymer was then extruded from the autoclave under nitrogen pressure, quenched in water and cut into small flakes.

The resultant white polymer was not discoloured after treatment with sodium chlorite solution, whereas a similar polymer from which the tungstophosphoric acid had been omitted was stained brown under the same conditions.

Example 4

A mixture of 262 parts of hexamethylene diammonium adipate, 175 parts of water, 0.6 part of acetic acid, 0.05 part of manganese acetate tetrahydrate and 0.05 part of sodium molybdate dihydrate was heated in an autoclave in the absence of air. When, at a temperature of about 215° C., the pressure had risen to 250 p.s.i.g. it was maintained at this level by releasing steam. About ten minutes after the start of steam release 4.52 parts of $TiO_2$ dispersed in water was added to the autoclave and heating was continued until the temperature had risen to 245° C. The pressure was then gradually reduced to atmospheric pressure over 90 minutes while heating was continued at 270–275° C., and atmospheric pressure for a further 30 minutes and the polymer was then extruded from the autoclave under nitrogen pressure, quenched in water and cut into small flakes.

The resultant polymer was discoloured after treatment with sodium chlorite solution, whereas a similar polymer from which the sodium molybdate had been omitted was stained brown under the same conditions.

We claim:

1. Synthetic linear fibre forming polyamides containing titanium dioxide and a light stabilizing manganese compound and which are stabilized against discoloration by bleaching agents by the presence, in said polyamide, of a compound selected from the group consisting of oxides, oxy-acids and heteropolyacids of tungsten and molybdenum.

2. The polyamides of claim 1 which contain the tungsten or molybdenum compound in the proportion of from 0.001% to 1.0% by weight of the polyamide calculated as metal.

3. The polyamides of claim 1 which contain the manganese compound in the proportion of from 5 parts per million to 100 parts per million by weight of the polyamide calculated as manganese and the metal compound in the proportion of from 0.001% to 2.25% by weight of the polyamide calculated as metal.

4. The polyamides of claim 1 which contain a light stabilizing copper compound and an alkali metal halide salt.

5. Synthetic linear fibre forming polyamides containing titanium dioxide and stabilized against light and discoloration by bleaching agents by the presence in said polyamide of a compound selected from the group consisting of the tungstate, phosphotungstate, molybdate and phosphomolybdate of manganese.

(References on following page)

References Cited

UNITED STATES PATENTS

| | | |
|---|---|---|
| 2,557,808 | 6/1951 | Walker. |
| 2,342,823 | 2/1944 | Schlack. |
| 2,671,770 | 3/1954 | Chezaud. |
| 2,705,227 | 3/1955 | Stamatoff _____ 260—45.75 |
| 2,887,462 | 5/1959 | Van Ott _____ 260—45.75 |
| 2,985,621 | 5/1961 | Brandes _____ 260—45.75 |
| 3,117,948 | 1/1964 | Notarbartolo _____ 260—45.75 |
| 3,002,947 | 10/1961 | Maple. |
| 3,110,697 | 11/1963 | Notarbartolo _____ 260—45.75 |
| 3,239,485 | 3/1966 | Koch. |
| 2,855,377 | 10/1958 | Stott. |

MORRIS LIEBMAN, Primary Examiner

P. R. MICHL, Assistant Examiner

U.S. Cl. X.R.

260—45.75